(12) United States Patent
Henry et al.

(10) Patent No.: US 6,421,774 B1
(45) Date of Patent: Jul. 16, 2002

(54) STATIC BRANCH PREDICTOR USING OPCODE OF INSTRUCTION PRECEDING CONDITIONAL BRANCH

(75) Inventors: G. Glenn Henry; Terry Parks, both of Austin, TX (US)

(73) Assignee: IP First L.L.C., Fremont, CA (US)

( * ) Notice: Subject to any disclaimer, the term of this patent is extended or adjusted under 35 U.S.C. 154(b) by 0 days.

(21) Appl. No.: 09/434,090

(22) Filed: Nov. 5, 1999

(51) Int. Cl.$^7$ .............................................. G06F 9/32
(52) U.S. Cl. ...................................................... 712/239
(58) Field of Search ................. 712/239, 233, 712/234

(56) References Cited

U.S. PATENT DOCUMENTS

| | | | |
|---|---|---|---|
| 4,858,104 A | * 8/1989 | Matsuo et al. ............... | 712/240 |
| 5,142,634 A | * 8/1992 | Fite et al. .................... | 712/240 |
| 5,692,167 A | * 11/1997 | Grochowski et al. ....... | 712/239 |
| 5,758,142 A | * 5/1998 | McFarling et al. .......... | 712/239 |
| 5,805,878 A | * 9/1998 | Rahman et al. ............. | 712/239 |
| 5,832,259 A | * 11/1998 | Stiles .......................... | 712/238 |

OTHER PUBLICATIONS

The Agree Predictor: A Mechanism for Reducing Negative Branch History Interference, Eric Sprangle, Robert S. Chappell, Mitch Alsup, Yale N. Patt, 1997, pp. 284–291.

* cited by examiner

*Primary Examiner*—Eddie Chan
*Assistant Examiner*—Stephanie Deckter
(74) *Attorney, Agent, or Firm*—E. Alan Davis; James W. Huffman (57) ABSTRACT

An improved Agree branch predictor is provided. The branch predictor biasing bit is generated by a static predictor that makes a static prediction. The static predictor maintains a register storing an instruction preceding a conditional branch instruction for which the prediction is to be made. The static predictor makes the static prediction based upon a table of predetermined combinations of the preceding instruction type and upon a test type specifying a condition upon which the conditional branch instruction will be taken. In addition, the static predictor makes the static prediction based upon the sign of a displacement for calculating a target address of the branch. The static prediction is correlated with an Agree/Disagree prediction generated by a history table of previous outcomes of conditional branch instructions.

29 Claims, 5 Drawing Sheets

|  | add | sub | cmp | log | shf | jcc |
|---|---|---|---|---|---|---|
| JO | D | NT | D | T | D | D |
| JNO | -D | -D | -D | -D | -D | -D |
| JC | D | -D | D | NT | NT | D |
| JNC | NT | NT | NT | D | D | T |
| JZ | NT | NT | NT | D | T | NT |
| JNZ | D | D | D | NT | -D | T |
| J(C|Z) | -D | D | T | NT | -D | D |
| JN(C|Z) | NT | T | D | NT | -D | NT |
| JS | NT | NT | NT | NT | T | NT |
| JNS | -D | T | -D | T | -D | -D |
| JP | -D | -D | -D | -D | -D | -D |
| JNP | -D | -D | -D | -D | -D | -D |
| J(S^O) | D | NT | D | NT | -D | NT |
| JN(S^O) | D | D | NT | T | -D | NT |
| J(S^O)|Z | NT | NT | D | NT | -D | NT |
| JN(S^O)|Z | T | T | D | T | -D | D |

| opcode type | opcode |
|---|---|
| add | ADD, ADC, INC |
| sub | SUB, SBB, DEC |
| cmp | CMP |
| shf | ROR, ROL, RCR, RCL, SHR, SHL, SAR, SAL |
| log | OR, AND, XOR |
| jcc | JCC |

STATIC BRANCH PREDICTOR USING OPCODE OF INSTRUCTION PRECEDING CONDITIONAL BRANCH

BACKGROUND OF THE INVENTION

1. Field of the Invention

This invention relates in general to the field of pipelined microprocessor architecture, and more particularly to the prediction of conditional branch instruction outcomes.

2. Description of the Related Art

Computer instructions are typically stored in successive addressable locations within a memory. When processed by a Central Processing Unit (CPU), the instructions are fetched from consecutive memory locations and executed. Each time an instruction is fetched from memory, a program counter, or instruction pointer, within the CPU is incremented so that it contains the address of the next instruction in the sequence. This is the next sequential instruction pointer, or NSIP. Fetching of an instruction, incrementing of the program counter, and execution of the instruction continues linearly through memory until a program control instruction is encountered.

A program control instruction, when executed, changes the address in the program counter and causes the flow of control to be altered. In other words, program control instructions specify conditions for altering the contents of the program counter. The change in the value of the program counter as a result of the execution of a program control instruction causes a break in the sequence of instruction execution. This is an important feature in digital computers, as it provides control over the flow of program execution and a capability for branching to different portions of a program. Examples of program control instructions include Jump, Test and Jump conditionally, Call, and Return.

A Jump instruction causes the CPU to unconditionally change the contents of the program counter to a specific value, i.e., to the target address for the instruction where the program is to continue execution. A Test and Jump conditionally causes the CPU to test the contents of a status register, or possibly compare two values, and either continue sequential execution or jump to a new address, called the target address, based on the outcome of the test or comparison. A Call instruction causes the CPU to unconditionally jump to a new target address, but also saves the value of the program counter to allow the CPU to return to the program location it is leaving. A Return instruction causes the CPU to retrieve the value of the program counter that was saved by the last Call instruction, and return program flow back to the retrieved instruction address.

In early microprocessors, execution of program control instructions did not impose significant processing delays because such microprocessors were designed to execute only one instruction at a time. If the instruction being executed was a program control instruction, by the end of execution the microprocessor would know whether it should branch, and if it was supposed to branch, it would know the target address of the branch. Thus, whether the next instruction was sequential, or the result of a branch, it would be fetched and executed.

Modern microprocessors are not so simple. Rather, it is common for modern microprocessors to operate on several instructions at the same time, within different blocks or pipeline stages of the microprocessor. Hennessy and Patterson define pipelining as, "an implementation technique whereby multiple instructions are overlapped in execution."

Computer Architecture: A Quantitative Approach, $2^{nd}$ edition, by John L. Hennessy and David A. Patterson, Morgan Kaufmann Publishers, San Francisco, Calif., 1996. The authors go on to provide the following excellent illustration of pipelining:

A pipeline is like an assembly line. In an automobile assembly line, there are many steps, each contributing something to the construction of the car. Each step operates in parallel with the other steps, though on a different car. In a computer pipeline, each step in the pipeline completes a part of an instruction. Like the assembly line, different steps are completing different parts of the different instructions in parallel. Each of these steps is called a pipe stage or a pipe segment. The stages are connected one to the next to form a pipe-instructions enter at one end, progress through the stages, and exit at the other end, just as cars would in an assembly line.

Thus, as instructions are fetched, they are introduced into one end of the pipeline. They proceed through pipeline stages within a microprocessor until they complete execution. In such pipelined microprocessors it is often not known whether a branch instruction will alter program flow until it reaches a late stage in the pipeline. However, by this time, the microprocessor has already fetched other instructions and is executing them in earlier stages of the pipeline. If a branch causes a change in program flow, all of the instructions in the pipeline that followed the branch must be thrown out. In addition, the instruction specified by the target address of the branch instruction must be fetched. Throwing out the intermediate instructions, and fetching the instruction at the target address creates processing delays in such microprocessors.

To alleviate this delay problem, many pipelined microprocessors use branch prediction mechanisms in an early stage of the pipeline that predict the outcome of branch instructions, and then fetch subsequent instructions according to the branch prediction.

A popular branch prediction scheme uses a branch history table (BHT), or prediction history table (PHT), to make predictions about conditional branch instruction outcomes. One simple BHT is an array of single bits. Each bit stores the last outcome of a branch instruction. For example, the bit stores a 1 if the branch was taken the last time it was executed and a 0 if the branch was not taken the last time it was executed.

The array is indexed by the address of the branch instruction. To make a prediction for a branch instruction, a branch predictor takes the address of the branch instruction and outputs the bit from the array entry selected by the address. Thus, the prediction for a given execution of a branch instruction is the outcome of the previous execution of the branch instruction. After the branch instruction executes (i.e., once the microprocessor resolves whether the branch is taken or not) the bit indexed by the branch instruction address is updated with the actual branch instruction outcome. A branch prediction mechanism such as a branch history table is commonly referred to as a dynamic branch prediction mechanism because it keeps a history of the outcome of branch instructions as a program executes and makes predictions based upon the history.

Many computer systems today have memory address ranges on the order of gigabytes. It is not practical for the BHT to be as large as the memory space of the system in which the microprocessor operates. Common BHT sizes are 1 KB to 4 KB. Therefore, only a portion of the address branch instruction is used to index into the BHT. Typically, the lower address bits are used as the index. Consequently, sometimes two or more branch instructions will index into the same location in the BHT. This phenomenon is commonly referred to as aliasing. This phenomenon occurs similarly in caches. However, most BHT's do not have cache tags and sets. Therefore, the outcome of the newer branch will replace the outcome of the older branch. This may be detrimental if the older branch executes next, rather than the newer branch.

The aliasing phenomenon is also referred to as PHT interference, since the outcome of one branch is interfering with the subsequent prediction of another completely unrelated branch. See Eric Spangle, Robert S. Chappell, Mitch Alsup, Yale N. Patt, "The Agree Predictor: A Mechanism for Reducing Negative Branch History Interference", Proceedings of the 24th International Symposium on Computer Architecture, Denver, June 1997, which is hereby incorporated by reference.

Spangle defines interference as "a branch accessing a PHT entry that was previously updated by a different branch." He notes that interference may be positive, negative or neutral. A positive interference is one that causes a correct prediction that would otherwise have been a misprediction. A negative interference is one that causes a misprediction that would otherwise have been a correct prediction. A neutral interference is one that does not affect the correctness of the prediction. Spangle goes on to show that negative interference has a substantial impact on branch prediction accuracy overall.

Some solutions have attempted to reduce the number of interferences. One solution is to increase the size of the PHT. However, increasing the size of the PHT increases cost significantly because it requires a substantial additional amount of hardware.

Spangle proposes a solution to the interference problem that he refers to as "agree prediction." Agree prediction, rather than attempting to reduce the number of interferences, converts negative interferences to positive or neutral interferences. This is accomplished by storing different information in the PHT than the outcome of the last branch instruction.

The agree prediction scheme relies on a biasing bit. The biasing bit indicates a prediction of the outcome of the branch. However, unlike the PHT entries, the value of the biasing bit is not updated with each execution of the branch instruction. The biasing bit remains the same over the course of program execution.

With agree prediction, the bit stored in the PHT predicts whether or not the branch outcome will be correctly predicted by the biasing bit, rather than predicting the branch outcome itself. Essentially, the agree predictor predicts whether the branch outcome will "agree" with the biasing bit's prediction. Thus, each time a branch is resolved, the PHT is updated with an indication of whether the biasing bit agreed with the actual outcome.

How the agree prediction converts negative interferences to positive or neutral interferences can perhaps best be illustrated by first looking at the operation of the older scheme. For example, assume two branch instructions alias to the same entry in the PHT. Also assume one branch has an 80% taken percentage and the other branch has a 30% taken percentage. The probability that the two branches will have opposite outcomes is the probability the first branch will be taken times the probability the second branch will not be taken plus the probability the first branch will not be taken times the probability the second branch will be taken. In our example the probability is:

$$(80\%*70\%)+(20\%*30\%)=62\%.$$

However, in agree prediction the probability that the two branches will have opposite outcomes is a function of the prediction accuracy of the biasing bit. This probability is the probability the first branch agrees with the biasing bit times the probability the second branch disagrees with the biasing bit plus the probability the first branch disagrees with the biasing bit times the probability the second branch agrees with the biasing bit, or:

$$P_1*(1-P_2)+(1-P_1)*P_2,$$

where $P_1$ is the prediction accuracy of the biasing bit for the first branch and $P_2$ is the prediction accuracy of the biasing bit for the second branch.

To illustrate, if the prediction accuracy of the biasing bit is 70% for each branch, then the probability that the two branches will have opposite outcomes with agree prediction is:

$$(70\%*30\%)+(30\%*70\%)=42\%.$$

Thus, it may be observed that the probability that two different branches that alias to the same history table entry will have opposite values is lower with the Agree predictor than the conventional scheme, thereby reducing the detrimental effects of negative interference.

Spangle proposed two biasing bit schemes. The first is referred to as the "first time" mechanism. The first time mechanism stores the outcome of the branch the first time it is executed and uses that outcome as the biasing bit value. For example, the biasing bit may be stored in an instruction cache or branch target buffer (BTB) of the microprocessor.

The second biasing bit scheme is referred to as the "most often" scheme. With the most often scheme, the program is executed and statistics of the branch outcomes are gathered. After the statistics are gathered, the biasing bit is given the value of the most frequent outcome for each branch. An example of a processor that uses the most often scheme is the Hewlett-Packard® PA-8500 microprocessor. See Linley Gwennap, "Gshare, 'Agrees' Aid Branch Prediction", Microprocessor Report, Nov. 17, 1997. The PA-8500 relies on dedicated static branch prediction bits in the branch instruction itself which are populated based upon previous executions of the program.

However, the first time and most often schemes have important limitations. The most often scheme requires a static branch prediction bit in the instruction format. This is not helpful for microprocessor architectures that do not have a static branch prediction bit, such as the x86 architecture instruction set.

The first time scheme requires significant additional hardware, which increases the cost of the microprocessor. The additional hardware required is directly proportional to the size of the PHT. Thus, if the size of the PHT is 4K entries, then 4K additional biasing bits must be added.

U.S. patent application Ser. No. 09/203,884, now U.S. Pat. No. 6,247,122, entitled Method and Apparatus for Performing Branch Prediction Combining Static and Dynamic Predictors, having the same assignee and inventors, and hereby incorporated by reference, describes a branch prediction method that employs a static prediction based on the test type in the opcode of a conditional branch instruction specifying a condition upon which the conditional branch instruction will be taken as a biasing bit for correlation with an Agree dynamic branch predictor.

The disclosed method has the advantage of not requiring the relatively large additional amount of hardware associated with "first time" or "most often" biasing bit schemes. However, microprocessor pipeline depths continue to increase, resulting in more severe performance degradation when branches are mispredicted. This generates a demand for even greater branch prediction accuracy.

Using the illustration above, if the prediction accuracy of the biasing bit is 80% for each branch rather than 70%, then the probability that the two branches will have opposite outcomes with agree prediction is:

(80%*20%)+(20%*80%)=32%.

This example illustrates the importance of improved biasing bit accuracy.

Therefore, what is needed is a static branch prediction mechanism that provides a more accurate biasing bit without requiring large amounts of additional hardware or dedicated biasing bits in the instruction format such as is required with first time or most often biasing bit schemes.

SUMMARY

To address the above-detailed deficiencies, it is an object of the present invention to provide a static branch predictor that provides a biasing bit with improved static prediction accuracy for use within an Agree predictor. Accordingly, in attainment of the aforementioned object, it is a feature of the present invention to provide an Agree branch predictor within a microprocessor including a history table for storing a plurality of Agree/Disagree predictions regarding outcomes of conditional branch instructions, the Agree predictor also including a correlator, coupled to the history table, that correlates a biasing bit with an Agree/Disagree prediction generated by the history table to generate a final prediction of conditional branch instruction outcomes. The Agree predictor includes a static predictor, coupled to the correlator, that generates the biasing bit to indicate a static prediction of an outcome of a conditional branch instruction. The static predictor generates the biasing bit based upon a test type specifying a condition upon which the conditional branch instruction will be taken and based upon an opcode of an instruction preceding the conditional branch instruction.

An advantage of the present invention is that it provides an accurate biasing bit without requiring the relatively large additional amount of hardware associated with other biasing bit schemes and without requiring a dedicated biasing bit within the instruction format. Another advantage of the present invention is that it provides the accurate biasing bit within the constraints of already existing, well-established instruction formats, such as the x86 instruction format.

In another aspect, it is a feature of the present invention to provide a method for statically predicting the outcome of conditional branch instructions within a microprocessor. The method includes receiving a test type of a conditional branch instruction for specifying a condition upon which the conditional branch instruction will be taken, receiving an opcode of an instruction preceding the conditional branch instruction, and making a static prediction of an outcome of the conditional branch instruction based upon the test type and the opcode.

In yet another aspect, it is a feature of the present invention to provide a branch prediction mechanism for predicting conditional branch instruction outcomes within a microprocessor. The branch prediction mechanism includes a first input that receives an indication of a test type of a conditional branch instruction specifying a condition upon which the conditional branch instruction will be taken and a second input that receives an opcode of an instruction preceding the conditional branch instruction. The branch prediction mechanism also includes an output that indicates a prediction of whether the conditional branch instruction will be taken and prediction logic, coupled to the first and second inputs and the output, that makes the prediction on the output based on the test type and the opcode.

In yet another aspect, it is a feature of the present invention to provide an Agree branch predictor within a microprocessor including a history table for storing a plurality of Agree/Disagree predictions regarding outcomes of conditional branch instructions, the Agree predictor also including a static predictor for generating a biasing bit to indicate static predictions of conditional branch instruction outcomes, the Agree predictor also including a correlator, coupled to the history table and the static predictor, for correlating the biasing bit with an Agree/Disagree prediction generated by the history table to generate a final prediction of conditional branch instruction outcomes. The Agree predictor includes an instruction register, coupled to the static predictor, that stores an indication of the instruction opcode of an instruction preceding a conditional branch instruction. The static predictor generates the biasing bit based upon a test type specifying a condition upon which the conditional branch instruction will be taken and based upon the opcode of the instruction preceding the conditional branch instruction.

BRIEF DESCRIPTION OF THE DRAWINGS

These and other objects, features, and advantages of the present invention will become better understood with regard to the following description, and accompanying drawings where.

DETAILED DESCRIPTION

Figure 1:
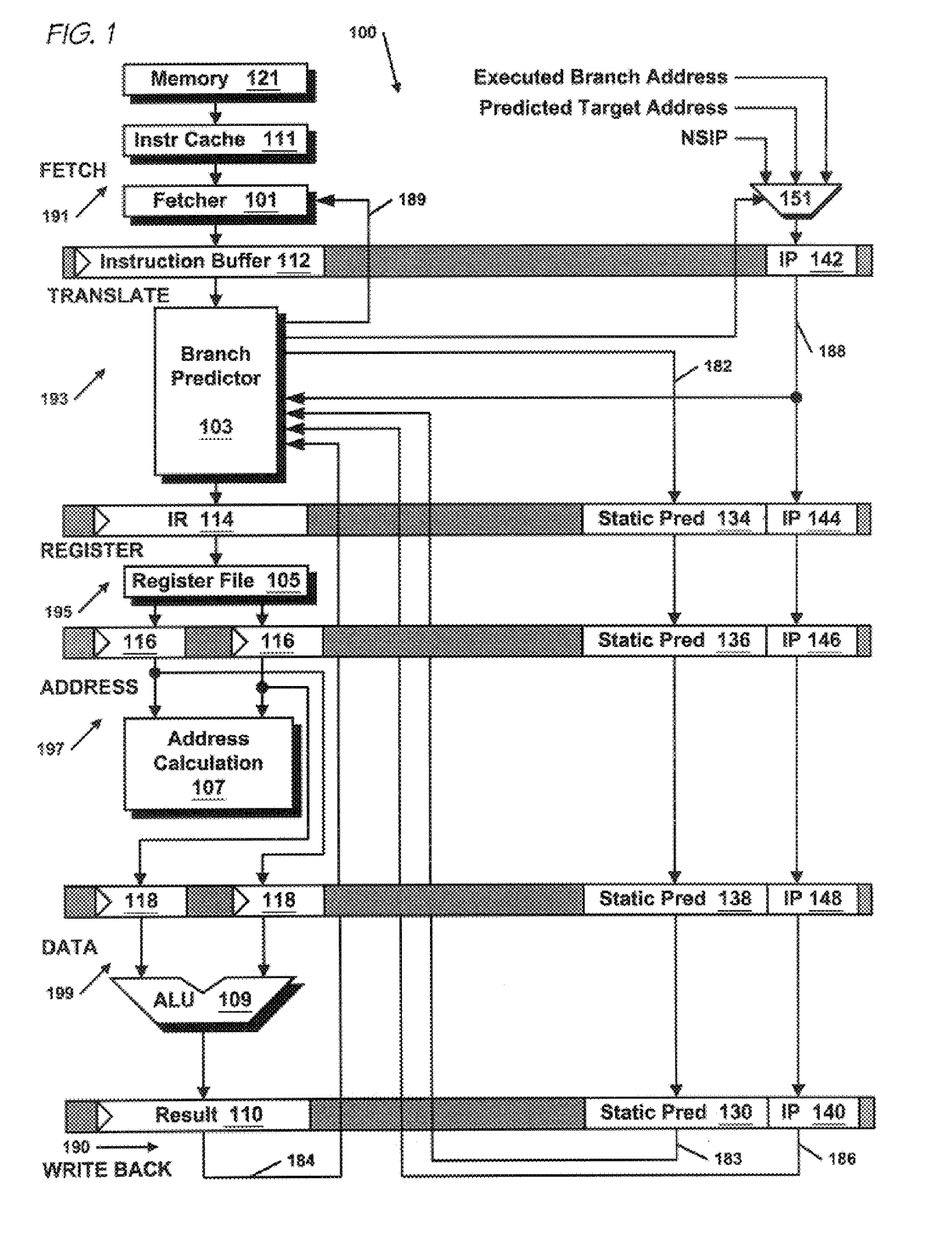
FIG. 1 is a block diagram of a pipelined microprocessor including a branch prediction mechanism according to the present invention.

Referring to FIG. 1, a block diagram of a pipeline microprocessor 100 according to the present invention is shown. The microprocessor 100 includes fetch 191, translate 193, register 195, address 197, data 199 and write back 190 stages coupled together to form a pipeline through which instructions are processed.

The fetch stage 191 includes a fetcher 101, which fetches macro instructions that are to be executed by the microprocessor 100 from an instruction cache 111 and memory 121. The fetcher 101 fetches instructions according to the contents of an instruction pointer (IP) 142 and places the instructions into an instruction buffer 112. Normally the IP 142 includes the value of a next sequential instruction pointer (NSIP), which is the address of the previous instruction plus the size of the previous instruction. However, when a branch instruction is taken, the executed branch target address is provided to the IP 142 to indicate the change in program flow effected by the branch instruction. Additionally, if it is predicted that a conditional branch instruction will be taken, the predicted target address of the branch instruction is provided to the IP 142. This enables the fetch stage 191 to fetch as the next instruction the instruction at the branch target address rather than the instruction in the next sequential memory location. A branch predictor 103 in the translate stage 193 controls the selection, via a multiplexer 151, of the contents to be loaded into the IP 142 based upon a prediction of whether a conditional branch instruction will be taken. Furthermore, the branch predictor 103 provides a signal 189 to the fetcher 101 to indicate the prediction of whether the conditional branch instruction will be taken or not taken.

The translate stage 193 translates or decodes the fetched macro instructions, such as conditional branch instructions, in the instruction buffer 112 into a sequence of micro operations, or micro instructions, that may be executed by the microprocessor 100. The micro instructions are placed into an instruction register (IR) 114. The translate stage 193 includes branch predictor 103 which makes predictions about the outcome of conditional branch instructions.

The branch predictor 103 receives the address of branch instructions from the IP 142 via signal 188 and uses the branch address to index into a history table storing Agree/Disagree predictions, described below. The branch instruction address is piped down with the branch instruction through the various stages of the pipeline via registers 144, 146, 148 and 140. The branch predictor 103 receives the branch instruction address, which was piped down along with the branch instruction, via signal 186, and uses the branch instruction address to update the Agree/Disagree history table. The branch predictor 103 makes conditional branch instruction outcome predictions based upon a static branch prediction based upon the test type of the conditional branch instruction specifying a condition upon which the conditional branch instruction will be taken, upon an opcode of an instruction preceding the conditional branch instruction and upon a sign of a displacement for calculating a target address of the conditional branch instruction, as discussed in more detail below.

The branch predictor 103 indicates information relating to its static prediction of the outcome of a conditional branch on signal 182. The static prediction operates as a biasing bit in the Agree branch predictor 103, as described below. The static prediction information is stored in a static prediction (Static Pred) register 134. The static prediction information is piped down with the conditional branch instruction through the various stages of the pipeline via static prediction registers 136, 138 and 130. The static prediction is provided from the last static prediction register 130 in the pipeline to branch predictor 103 via signal 183 so that branch predictor 103 may use the static prediction and the branch outcome to determine if the static prediction was correct and update the Agree/Disagree history table accordingly.

The register stage 195 retrieves operands specified by the micro operations from a register file 105 for use by later stages in the pipeline. Preferably, the register file 105 includes a status flags register that is used in determining whether branch conditions have been satisfied.

The address stage 197 calculates memory addresses specified by micro operations, to be used in data storage and retrieval operations. In one embodiment, the branch target address of the branch instruction is calculated in the address stage 197 by address calculation unit 107. In another embodiment, the branch target address is calculated in the translate stage. For a description of branch target address calculation in the translate stage see U.S. patent application Ser. No. 08/962,344, now abandoned, entitled "Method and Apparatus for Branch Address Calculation During Decode" filed Oct. 31, 1997 by G. Glenn Henry and Terry Parks, which is hereby incorporated by reference.

The data/ALU stage 199 either performs ALU operations on data retrieved from the register file 105, or reads/writes data from/to memory using the memory address calculated in the address stage 197. The data/ALU stage 199 also resolves the outcomes of conditional branch instructions. That is, the data/ALU stage 199 determines whether or not the condition upon which the conditional branch instruction will be taken or not taken has been met. An example of a branch condition is whether or not a particular flag in a status register is set or clear, such as a carry flag or an overflow flag. The data/ALU stage 199 provides the result, or outcome, of the determination of the condition to a result register 110.

The write back stage 190 writes the result of a data read operation, or an ALU operation, to the register file or to a memory location. The write back stage 190 also provides the result of the conditional branch outcome to branch predictor 103 via signal 184. This enables branch predictor 103 to compare the outcome with the prediction information to determine if and how the Agree/Disagree history table should be updated.

Figure 2:
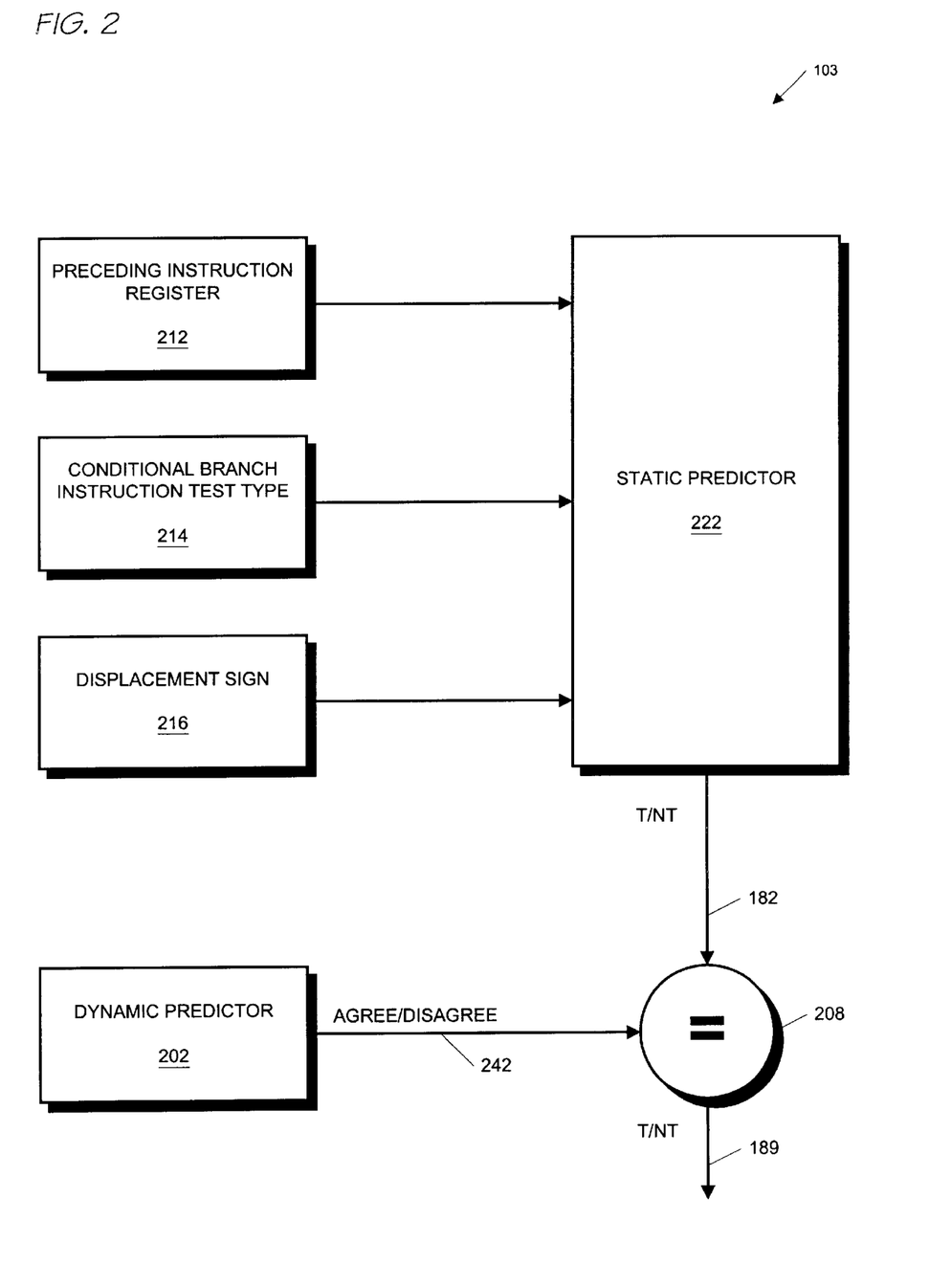
FIG. 2 is a detailed block diagram of the branch prediction mechanism of the microprocessor of FIG. 1 according to the present invention.

Referring now to FIG. 2, a block diagram illustrating in detail the branch predictor 103 of FIG. 1, is shown. Throughout the drawings, like elements are numbered identically for clarity and simplicity. The branch predictor 103 includes a dynamic predictor 202 for generating an Agree/Disagree prediction 242. The Agree/Disagree prediction 242 indicates an agreement or disagreement with the static prediction 182 regarding an outcome of a conditional branch instruction. The Agree/Disagree prediction 242 is generated based upon a history of previous branch instruction outcomes, as described with respect to FIG. 4.

The branch predictor 103 also includes a static predictor 222 for generating static prediction 182. Preferably, static predictor 222 comprises combinatorial logic configured to make the static prediction 182 based upon three inputs.

The static predictor 222 receives an indication of the opcode of an instruction which preceded the conditional branch instruction whose outcome is to be predicted from a preceding instruction register 212, coupled to the static predictor 222. The manner of updating the preceding instruction register 212 is described with respect to FIG. 5.

The static predictor 222 also receives a test type of the conditional branch, for specifying a condition upon which the conditional branch will be taken, from register 214. In one embodiment, the test type includes x86 conditional jump instruction (JCC) test types. In particular, the x86 conditional jump instruction test types include conditions based upon the carry, overflow, zero, parity and sign flags of the x86 FLAGS Register and various combinations thereof specified on pages D-1 and D-2 of the Intel Pentium Processor Family Developer's Manual Volume 3: Architecture and Programming Manual, 1995, which is hereby incorporated by reference.

The static predictor 222 also receives a sign of a displacement of the conditional branch instruction for calculating a target branch address of the conditional branch instruction stored in a register 216.

The static predictor 222 makes static prediction 182 based upon the three inputs as described in tables 300 and 302 of FIG. 3, described below.

The branch predictor 103 further includes a correlator 208 coupled to the dynamic predictor 202 and static predictor 222. The correlator 208 receives and correlates the Agree/Disagree prediction 242 and the static prediction 182 to generate a T/NT (Taken/Not Taken) final prediction 189. If the Agree/Disagree prediction 242 indicates Agree, the correlator 208 forwards the static prediction 182 to final prediction 189. However, if the Agree/Disagree prediction 242 indicates Disagree, the correlator 208 provides the inverse of the static prediction 182 to final prediction 189. Thus, static prediction 182 operates as a biasing bit for Agree/Disagree prediction 242.

Figure 3:
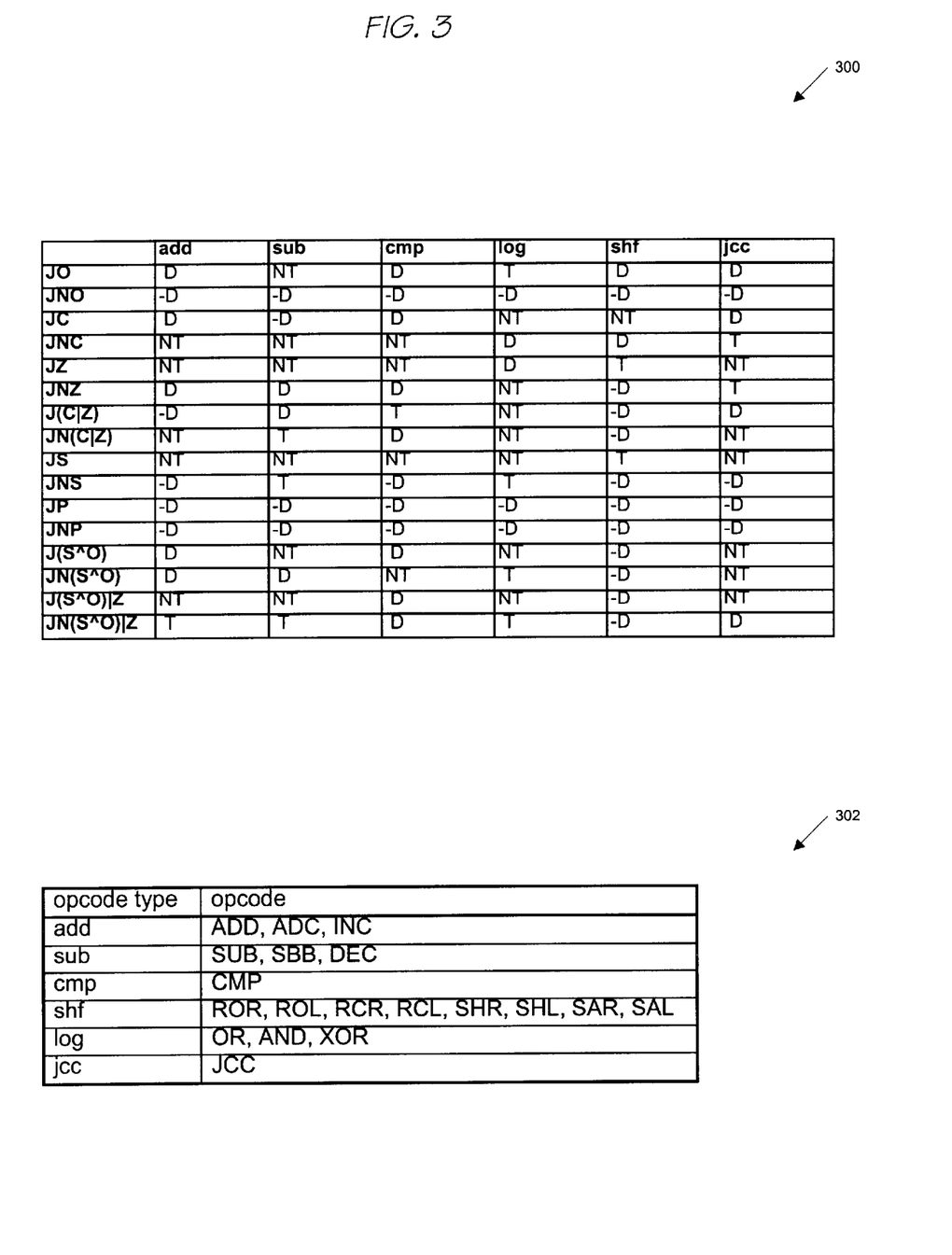
FIG. 3 is two tables illustrating operation of the static branch predictor of FIG. 2 according to the present invention.

Referring now to FIG. 3, two tables, 300 and 302, illustrating operation of the static predictor 222 of FIG. 2 are shown. Table 300 specifies static predictions made by static predictor 222 on static prediction output 182 for predetermined combinations of conditional branch instruction test type and preceding instruction opcode type. In table 300, "T" indicates Taken, "NT" indicates Not Taken, "D" indicates Taken if the displacement sign is positive and Not Taken if the displacement sign is negative, and "–D" indicates Taken if the displacement sign is negative and Not Taken if the displacement sign is positive.

The far left column of table 300 specifies conditional branch instruction test types. In particular, the test types correspond to the sixteen x86 JCC instruction test types specified in the above-referenced Intel manual.

The top row of table 300 specifies preceding instruction opcode types. In the embodiment of table 300, six different opcode types, or opcode groups, are specified. Table 302 specifies a list of x86 instructions corresponding to each of the opcode types.

The "add" opcode type includes the ADD (add), ADC (add with carry) and INC (increment) x86 instructions. The "sub" opcode type includes the SUB (subtract), SBB (subtract with borrow) and DEC (decrement) x86 instructions. The "cmp" opcode type includes the CMP (compare) x86 instruction. The "shf" opcode type includes the ROR (rotate right), ROL (rotate left), RCR (rotate right with carry), RCL (rotate left with carry), SHR (shift right), SHL (shift left), SAR (arithmetic shift right) and SAL (arithmetic shift left) x86 instructions. The "log" opcode type includes the OR (logical or), AND (logical and) and XOR (exclusive or) x86 instructions. The "jcc" opcode type includes the JCC (conditional jump) x86 instruction. Advantageously, the present inventors have determined through experimentation that the predetermined combinations of test type and preceding instruction opcode type and displacement sign specified in tables 300 and 302 provide improved branch prediction over previous branch prediction schemes.

Assume for the purpose of illustration, the static predictor 222 is making a static prediction about a JNZ instruction, i.e., a conditional jump instruction with a test type of "not zero." Assume also the instruction in the preceding instruction register 212 is a DEC instruction, which falls into the "sub" opcode type, as specified in table 302. Finally, assume the sign of the displacement for calculating the target address of the JNZ instruction is negative. Under the assumed conditions, the static predictor 222 would predict Not Taken on static prediction 182. This is because, as specified in table 300, for the combination of JNZ test type and "sub" opcode type, static predictor 222 predicts Taken if the displacement is positive and Not Taken if the displacement is negative.

Figure 4:
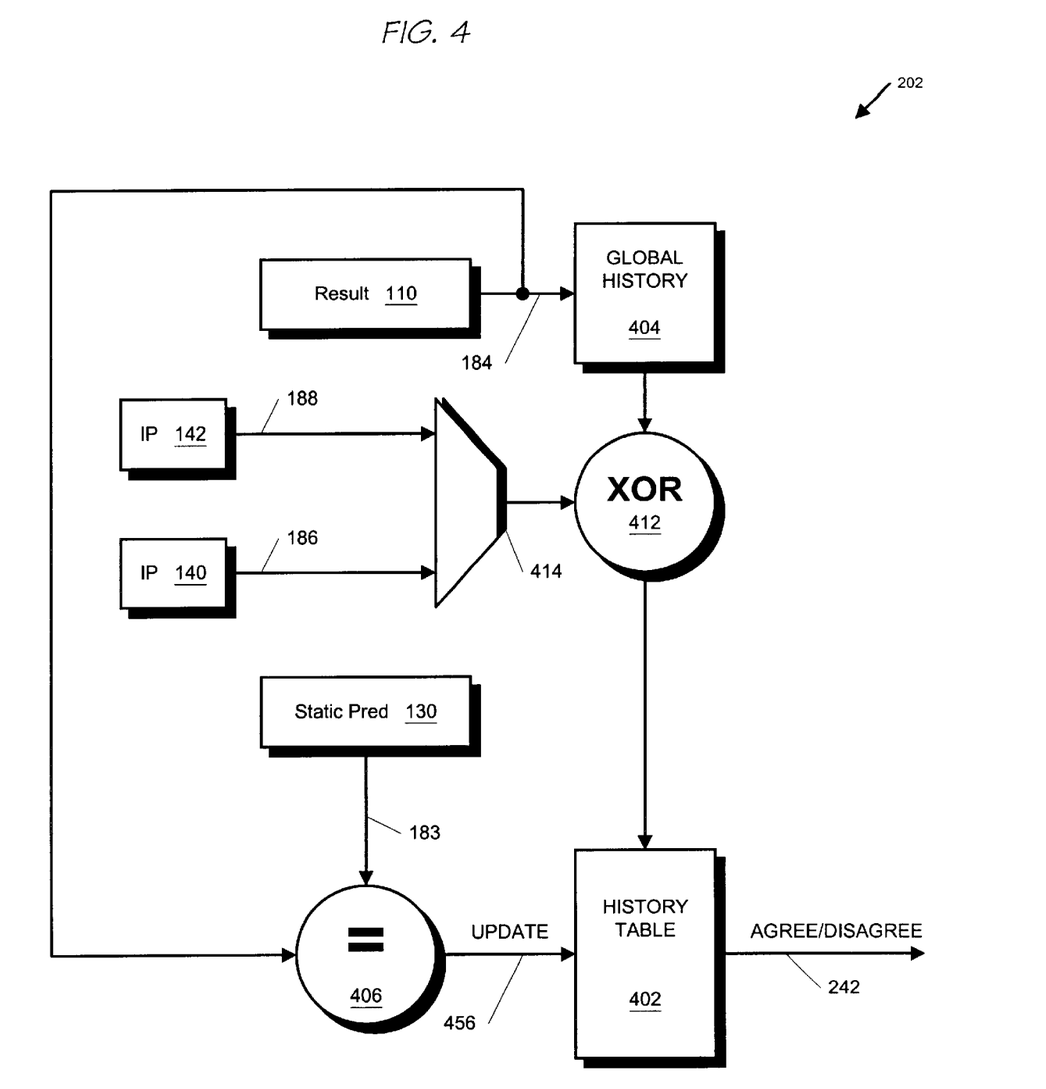
FIG. 4 is a detailed block diagram of the dynamic branch predictor of the branch prediction mechanism of FIG. 2 according to the present invention.

Referring now to FIG. 4, a block diagram illustrating in detail the dynamic predictor 202 of FIG. 2 is shown. The dynamic predictor 202 includes a history table 402. History table 402 comprises an array of storage elements indexed by index generation logic 412. Each storage element stores a single Agree/Disagree bit. The Agree/Disagree prediction bit in the array indexed by index generation logic 412 is either provided on Agree/Disagree prediction signal 242 or updated via update signal 456, depending upon whether a prediction or an update is being performed.

The Agree/Disagree bits are updated via update signal 456 generated by comparator 406. Comparator 406 receives static prediction 130 via signal 183 made by static predictor 222 and compares the static prediction 130 with the actual result, or outcome, 110 of the conditional branch instruction, received via signal 184. If static predictor 222 incorrectly predicts the outcome of the conditional branch instruction, then history table 402 is updated with a Disagree value as indexed by index generation logic 412. However, if static predictor 222 correctly predicts the outcome of the conditional branch instruction, then history table 402 is updated with an Agree value.

Preferably, index generation logic 412 comprises an exclusive OR gate for hashing a portion of the address of the conditional branch instruction and at least a portion of a global history of outcomes of conditional branch instructions stored in register 404 to generate an index into history table 402. The method of generating the history table 402 index in the embodiment of FIG. 4 is commonly referred to as gshare. When Agree/Disagree prediction 242 is to be generated by history table 402, multiplexer 414 selects the address of the conditional branch instruction indicated on signal 188 from instruction pointer register 142. When history table 412 is to be updated, multiplexer 414 selects the address of the conditional branch instruction indicated on signal 186 from instruction pointer register 140, which was piped down through the pipeline.

Global history register 404 comprises a shift register for storing the last N results of conditional branch instruction outcomes executed by the microprocessor 100. The global history register 404 receives the outcomes via result signal 184. In one embodiment, N is 12 and is equal to the number of address, or index, inputs to history table 402.

Figure 5:
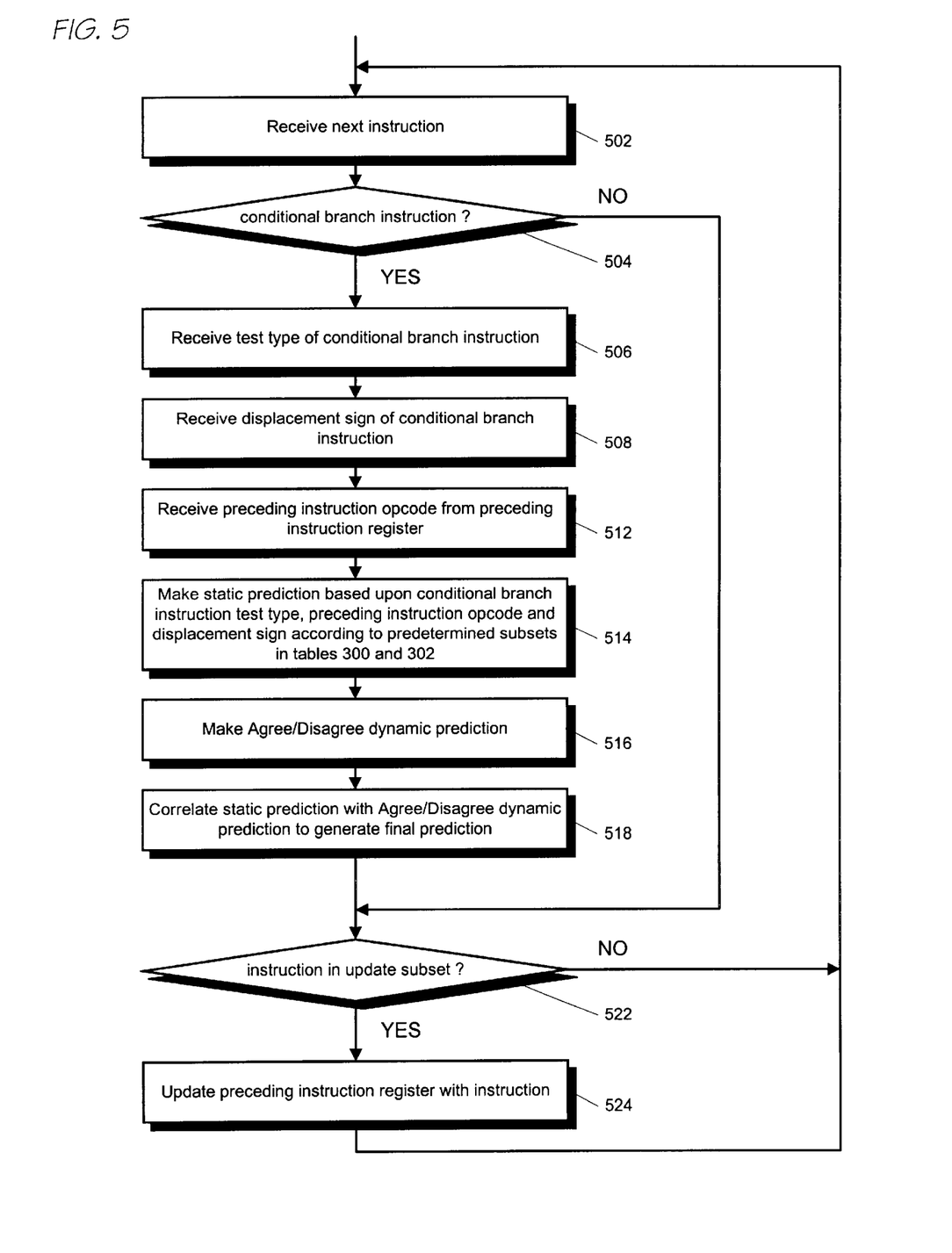
FIG. 5 is a flowchart illustrating operation of the branch prediction mechanism of FIG. 2 according to the present invention.

Referring now to FIG. 5, a flowchart illustrating operation of the branch predictor 103 of FIG. 2 is shown. The branch predictor 103 receives the next instruction to be translated, in step 502. The branch predictor 103 determines whether the instruction is a conditional branch instruction, in step 504. If the instruction is not a conditional branch instruction, then control transfers to step 522, described below.

If the instruction is a conditional branch instruction, then the static predictor 222 receives the test type of the conditional branch instruction from register 214, in step 506. The static predictor 222 receives the displacement sign of the conditional branch instruction from register 216, in step 508. The static predictor 222 receives the preceding instruction opcode from register 212, in step 512.

The static predictor 222 then makes a static prediction of the outcome of the conditional branch instruction on signal 182 based on the test type, displacement sign and preceding instruction opcode, as specified in tables 300 and 302 of FIG. 3, in step 514. The dynamic predictor 202 makes an Agree/Disagree dynamic prediction on prediction signal 242, in step 516. Correlator 208 correlates the static prediction 182 and the Agree/Disagree prediction 242 to generate final prediction 189, in step 518.

The branch predictor 103 determines whether the present instruction being translated is in a subset of instructions, i.e., opcodes, for which the preceding instruction register is to be updated, in step 522. Preferably, the subset of instructions for which the preceding instruction register 212 is updated is the list of opcodes specified in table 302.

If the present instruction is in the update subset, then the preceding instruction register 212 is updated with the present instruction, in step 524. Otherwise, the preceding instruction register 212 is not updated, but rather maintains its previous value, and control returns to step 502.

Although the present invention and its objects, features, and advantages have been described in detail, other embodiments are encompassed by the invention. For example, variations of the method of making the dynamic prediction may exist, such as by employing other indexing methods or by a hybrid branch predictor, as described in U.S. patent application Ser. No. 09/434,984, still pending, entitled "Hybrid Branch Predictor With Improved Selector Table Update Mechanism," having the same assignee and inventors, filed concurrently herewith, and hereby incorporated by reference. Additionally, variations on pipeline architectures exist, which combine some stages described in the present invention into a single stage, or separate one of the described stages into two or more stages. Furthermore, some of the microprocessor stages may be reordered as needed. Finally, the specific combinations of test type and preceding instruction operand type may be varied in different microprocessor architectures and instruction sets.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A branch prediction mechanism for predicting whether a conditional branch instruction will be taken or not taken, the mechanism comprising:

a dynamic predictor, for producing an agree/disagree signal;

a static predictor, coupled to said dynamic predictor, said static predictor using an instruction opcode type of an instruction preceding the conditional branch instruction to produce a taken/not taken signal;

wherein said agree/disagree signal is correlated with said taken/not taken signal to predict whether the conditional branch instruction will be taken.

2. The branch prediction mechanism of claim 1, wherein said static predictor produces said taken/not taken signal based upon whether said instruction opcode type of said preceding instruction is within one of a plurality of predetermined sets of opcode types.

3. The branch prediction mechanism of claim 2, wherein said plurality of predetermined sets of opcode types comprise two or more of the following opcode types:

arithmetic, logical, shift, compare and conditional jump opcode types.

4. The branch prediction mechanism of claim 1, further comprising:

a register, coupled to said static predictor, for storing at least a portion of said preceding instruction, or an indication of said preceding instruction.

5. The branch prediction mechanism of claim 4, wherein said register is updated with said at least a portion of said preceding instruction only if said instruction type is within a predetermined set of instruction types.

6. The branch prediction mechanism of claim 1, wherein said static predictor also uses a test type specifying a condition upon which the conditional branch instruction will be taken to produce said taken/not taken signal.

7. The branch prediction mechanism of claim 6, wherein the conditional branch instruction test type comprises an x86 conditional jump instruction test type.

8. The branch prediction mechanism of claim 6, wherein said static predictor is configured to predict the conditional branch instruction will be taken for a predetermined subset of combinations of conditional branch instruction test types and preceding instruction types.

9. The branch prediction mechanism of claim 1, wherein said static predictor also uses a sign of a displacement for calculating a target address of the conditional branch instruction to produce said taken/not taken signal.

10. The branch prediction mechanism of claim 1, wherein if said agree/disagree signal indicates agree, said taken/not taken signal is used to predict whether the conditional branch instruction will be taken.

11. The branch prediction mechanism of claim 1, wherein said dynamic predictor comprises a history table for storing a plurality of agree/disagree predictions.

12. A method for predicting the outcome of conditional branch instructions within a microprocessor, the method comprising:

receiving an indication of an opcode of an instruction preceding a conditional branch instruction; and making a static prediction of an outcome of said conditional branch instruction based upon said opcode.

13. The method of claim 12, wherein said making said static prediction based upon said opcode comprises predicting said conditional branch instruction will be taken if said opcode is within one of a plurality of predetermined opcode types.

14. The method of claim 12, further comprising:

receiving a test type of said conditional branch instruction for specifying a condition upon which said conditional branch instruction will be taken;

wherein said making said static prediction is made based upon said opcode and said test type.

15. The method of claim 24, wherein said making said static prediction comprises predicting said conditional branch instruction will be taken if said test type and said opcode are within a first predefined set of combinations of test type and opcode supported by the microprocessor, and predicting said conditional branch instruction will not be taken if said test type and said opcode are within a second predefined set of combinations of test type and opcode.

16. The method of claim 12, further comprising:

receiving a sign of a displacement for calculating a target address of said conditional branch instruction;

wherein said making said static prediction is made based upon said opcode and said displacement sign.

17. The method of claim 12, further comprising:

making an agree/disagree prediction regarding said static prediction; and correlating said static prediction with said agree/disagree prediction to generate a final prediction of said outcome of said conditional branch instruction.

18. The method of claim 17, wherein said correlating comprises providing said static prediction as said final prediction if said agree/disagree prediction indicates agree and providing an inverse of said static prediction if said agree/disagree prediction indicates disagree.

19. The method of claim 12, further comprising:
fetching an instruction at a target address of said conditional branch instruction if said conditional branch instruction is predicted not taken.

20. A branch prediction mechanism for predicting conditional branch instruction outcomes within a microprocessor, comprising:
an input, for receiving an opcode indicator of an instruction preceding a conditional branch instruction; and
an output, for indicating a prediction of whether said conditional branch instruction will be taken; and
prediction logic, coupled to said input and said output, for making said prediction indicated on said output based on said opcode indicator.

21. The branch prediction mechanism of claim 20, further comprising:
a preceding instruction register, coupled to said input, for storing said preceding instruction opcode indicator.

22. The branch prediction mechanism of claim 20, further comprising:
a second input, for receiving an indication of a test type of said conditional branch instruction specifying a condition upon which said conditional branch instruction will be taken;
wherein said prediction logic is configured to make said prediction based on said test type and said opcode indicator.

23. The branch prediction mechanism of claim 20, wherein said prediction logic is configured to predict said conditional branch instruction will be taken for a first predetermined set of combinations of test type and opcode in the microprocessor instruction set and to predict said conditional branch instruction will not be taken for a second predetermined set of combinations of test type and opcode.

24. The branch prediction mechanism of claim 20, further comprising:
a second input, coupled to said prediction logic, for receiving a sign of a displacement for calculating a target address of said conditional branch instruction;
wherein said prediction logic is configured to make said prediction based upon said preceding instruction opcode and said displacement sign.

25. The branch prediction mechanism of claim 24, wherein if said preceding instruction opcode falls within a predetermined set of opcodes, said prediction logic is configured to predict one outcome of said conditional branch instruction if said displacement sign is negative and to predict an opposite outcome of said conditional branch instruction if said displacement sign is positive.

26. The branch prediction mechanism of claim 20, further comprising:
a correlator, coupled to said output, for correlating said prediction indicated on said output with an agree/disagree prediction, wherein if said Agree/Disagree prediction indicates Agree said correlator provides said prediction indicated on said output as a final prediction of whether said conditional branch instruction will be taken.

27. An Agree branch predictor within a microprocessor including a correlator for correlating a biasing bit with an agree/disagree prediction to generate a final prediction of conditional branch instruction outcomes, the Agree predictor comprising:
an instruction register, for storing an opcode of an instruction preceding a conditional branch instruction; and
a static predictor, coupled to said instruction register, for generating the biasing bit in response to said preceding instruction opcode.

28. The Agree predictor of claim 27, wherein said instruction register is updated only with opcodes of instructions within a predetermined subset of the microprocessor instruction set opcodes.

29. The Agree predictor of claim 27, wherein said static predictor generates the biasing bit also in response to a test type indicating a condition upon which said conditional branch instruction will be taken.

* * * * *